(12) United States Patent
Burroughs, Jr. et al.

(10) Patent No.: US 10,885,505 B2
(45) Date of Patent: Jan. 5, 2021

(54) MANAGING ELECTRONIC FUNDS IN A NETWORK OF COMPUTING DEVICES

(71) Applicant: Accenture Global Services Limited, Dublin (IE)

(72) Inventors: James Stuart Burroughs, Jr., Huntersville, NC (US); Bernardo Jose Rodriguez, Old Greenwich, CT (US); Mark Edward Potts, Englewood, CO (US)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 1077 days.

(21) Appl. No.: 14/814,365

(22) Filed: Jul. 30, 2015

(65) Prior Publication Data
US 2017/0032351 A1    Feb. 2, 2017

(51) Int. Cl.
*G06Q 40/00*    (2012.01)
*G06Q 20/22*    (2012.01)
*G06Q 20/32*    (2012.01)
*G06Q 20/36*    (2012.01)

(52) U.S. Cl.
CPC .......... *G06Q 20/227* (2013.01); *G06Q 20/32* (2013.01); *G06Q 20/36* (2013.01)

(58) Field of Classification Search
CPC .................................................. G06Q 20/227
USPC .......................................................... 705/44
See application file for complete search history.

(56) References Cited

U.S. PATENT DOCUMENTS

| | | | |
|---|---|---|---|
| 10,068,220 B2* | 9/2018 | Perlman | G06Q 20/04 |
| 2002/0179704 A1 | 12/2002 | Deaton | |
| 2013/0024360 A1* | 1/2013 | Ballout | G06Q 40/02 |
| | | | 705/39 |
| 2013/0332357 A1* | 12/2013 | Green | G06Q 20/384 |
| | | | 705/44 |
| 2014/0195424 A1 | 7/2014 | Zheng et al. | |
| 2015/0154588 A1* | 6/2015 | Purves | G06O 30/0226 |
| | | | 705/14.27 |

OTHER PUBLICATIONS

Credit and Debits on the Internet IEEE Xplore/ IEEE Periodicals (Year: 1997).*

(Continued)

*Primary Examiner* — Bruce I Ebersman
*Assistant Examiner* — John A Anderson
(74) *Attorney, Agent, or Firm* — Mannava & Kang, P.C.

(57) ABSTRACT

Examples of the disclosure enable one or more transactions to be managed. In some examples, a first device and a second device are associated with an account. The first device has a first level of authorization with respect to the account, and the second device has a second level of authorization with respect to the account. An instruction to authorize the second device to have access to a first quantity of funds is received from the first device, and the second device is authorized to have access to the first quantity of funds. A request to access a second quantity of funds is received. The request is associated with the second device. The request to access the second quantity of funds is approved on the condition that the second quantity of funds is less than or equal to the first quantity of funds.

19 Claims, 11 Drawing Sheets

(56) References Cited

OTHER PUBLICATIONS

Burroughs et al., Family Wallet Idea submission to Citi Mobile Challenge Europe, Middle East, and Africa, Mar. 12, 2015, Family Wallet_video_2015 6.mp4 (screenshots attached hereto).

Burroughs et al., Family Wallet Idea submission to Citi Mobile Challenge Europe, Middle East, and Africa, Mar. 12, 2015, Entry notes description (attached hereto).

Burroughs et al., Family Wallet Idea submission to Citi Mobile Challenge Europe, Middle East, and Africa, Mar. 12, 2015, Family Wallet Customer Journey document (attached hereto).

Burroughs et al., Family Wallet Idea submission to Citi Mobile Challenge Europe, Middle East, and Africa, Mar. 12, 2015, Family Wallet Team Introduction document (attached hereto).

Burroughs et al., Family Wallet presentation at Citi Mobile Challenge Europe, Middle East, and Africa, Apr. 30, 2015, presented in London, Full presentation at :https://www.youtube.com/watch?v=jq--RJIIZ9g&feature=youtu.be Competition website at: http://www.citimobilechallenge.com/index.php.

* cited by examiner

*← 600*

| First User Device | Electronic Funds Manager 110 | Financial Institution Computing System 250 |
|---|---|---|
| Receive request to create account | | |
| Transmit request to create account | Receive request to create family wallet | |
| | Add first device to family wallet | |
| Receive request to add source account | Transmit request to add source account | |
| Receive financial account information | | |
| Transmit financial account information | Receive financial account information | |
| | Identify financial account computing system and log-on credentials | |
| | Transmit log-on credentials | Receive log-on credentials |
| | | Verify log on credentials |
| | Receive notification of verification | Transmit notification of verification |
| | Add source account | |
| Receive notification of source account addition | Transmit notification of source account addition | |

FIG. 6

| First User Device | Electronic Funds Manager 110 | Financial Institution Computing System 250 | Second User Device |
|---|---|---|---|
| Receive request to transfer funds | | | |
| Transmit request to transfer funds | Receive request to transfer funds | | |
| | Transmit request to transfer funds | Receive request to transfer funds | |
| | | Verify sufficient funds | |
| | Receive funds | Transmit funds | |
| Receive notification of transfer | Transmit notification of transfer | | |
| Receive request to add second device | | | |
| Transmit request to add second device | Receive request to add second device | | |
| | Generate invitation | | |
| | Transmit invitation | | Receive invitation |
| | | | Receive acceptance |
| | Receive acceptance | | Transmit acceptance |
| | Add second device to family wallet | | |

| Parent Device 120 | Electronic Funds Manager 110 | Other Device |
|---|---|---|
| Receive allocation of electronic funds | | |
| Transmit instruction to allocate electronic funds | Receive instruction to allocate electronic funds | |
| | Allocate electronic funds | |
| | Transmit notification of allocation | Receive notification of allocation |
| | Receive request to access electronic funds | Transmit request to access electronic funds |
| | Determine whether parameters satisfy thresholds | |
| | Approve request to access electronic funds | |
| | Transmit approval of request | Receive approval of request |

MANAGING ELECTRONIC FUNDS IN A NETWORK OF COMPUTING DEVICES

BACKGROUND

Digital wallets allow users to make a payment using electronic funds associated with the digital wallet. The digital wallet may be coupled to or associated with one or more financial accounts (e.g., bank accounts, credit card accounts, and the like) such that electronic funds are transferrable between the digital wallet and the financial account. A user may add payment options to the digital wallet and/or remove payment options from the digital wallet by selectively associating and disassociating financial accounts with the digital wallet. Digital wallets include or are associated with one or more security mechanisms that control access to a digital wallet. However, such security mechanisms either provide full access to the digital wallet or no access to the digital wallet.

BRIEF DESCRIPTION OF THE DRAWINGS

FIGS. 6 and 7 are example sequence diagrams showing operations of an initialization phase that may be performed by one or more computing devices, such as the computing device shown in FIG. 4.

FIG. 9 is an example sequence diagram showing operations of a use phase that may be performed by one or more computing devices, such as the computing device shown in FIG. 4.

Corresponding reference characters indicate corresponding parts throughout the drawings.

DETAILED DESCRIPTION

Figure 1:
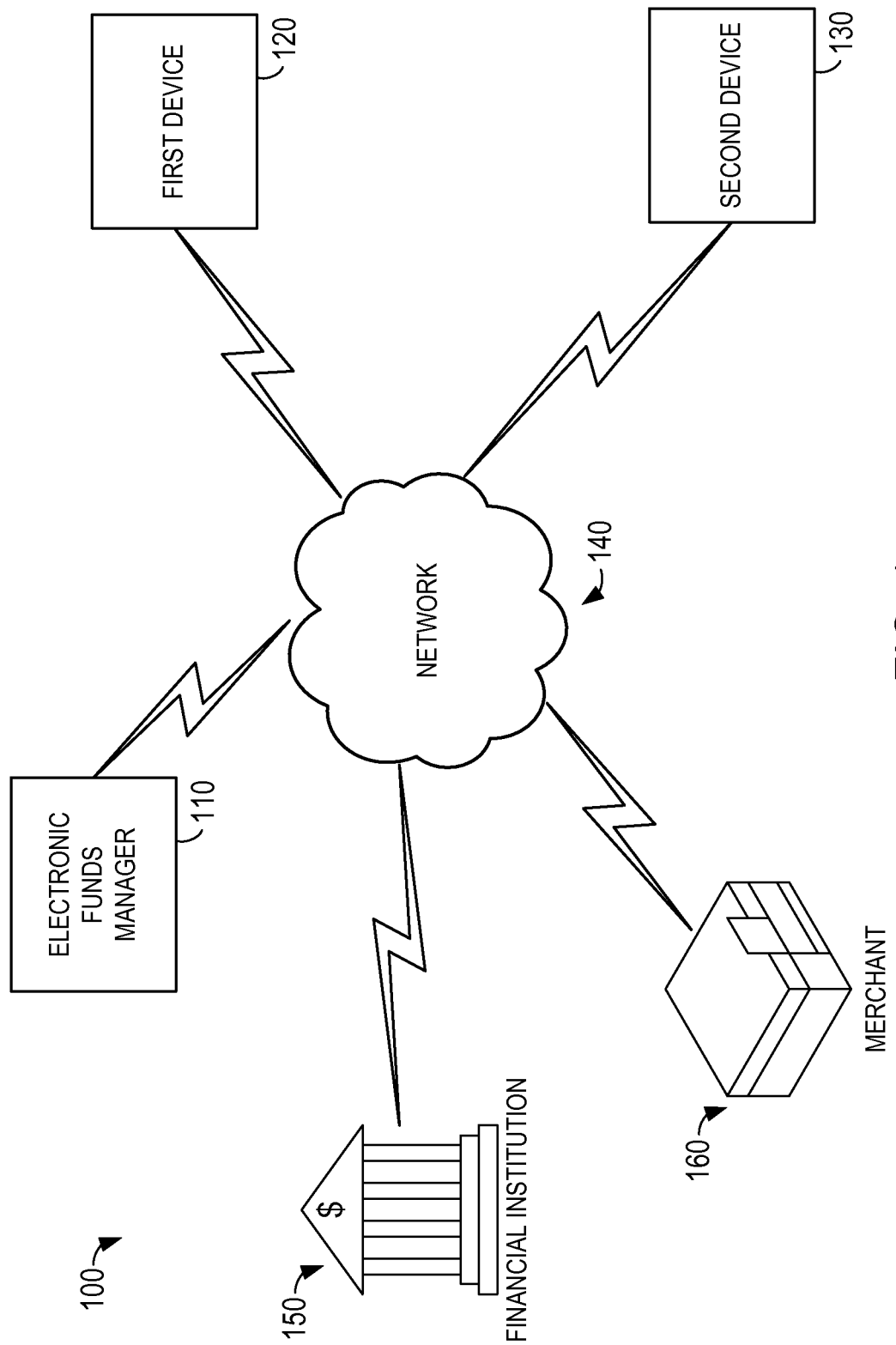
FIG. 1 is a diagram illustrating an example environment for managing electronic funds.

Examples of the disclosure may enable one or more transactions to be managed. In some examples, one or more user devices may be associated with an account. A first device of the one or more user devices may include a first level of authorization with respect to the account, and a second device of the one or more user devices may include a second level of authorization with respect to the account that is different from the first level of authorization. An instruction to authorize the second device to have access to a first quantity of funds may be received from the first device, and the second device may be authorized to have access to the first quantity of funds. A request to access a second quantity of funds maybe received and may be associated with the second device. The request to access the second quantity of funds may be approved on the condition that the second quantity of funds is less than or equal to the first quantity of funds.

The subject matter described herein relates generally to information processing and, more specifically, to managing one or more transactions. Examples of the disclosure provide the ability to allocate electronic funds among a plurality of computing devices, thereby providing access to at least some electronic funds while retaining at least some control. Examples described herein enable a computing system to associate one or more devices with an account, authorize a device to have access to electronic funds associated with the account, and determine whether to approve a request to access at least some of the electronic funds associated with the account.

Aspects of the disclosure enable a processing system to authorize a financial transaction in an environment including a plurality of computing devices coupled to each other via a network (e.g., the Internet). Examples of the disclosure enable a first device to allocate at least some electronic funds for use by another device (e.g., a second device) while maintaining at least some control over the electronic funds. The control may include, for example, determining whether sufficient electronic funds are associated with the account. Additionally or alternatively, the first device may control other aspects of how the electronic funds are used by the other device including, but not limited to, when and where the electronic funds are used.

By managing transactions and/or electronic funds in the manner described in this disclosure, some examples increase a speed of transactions and reduce network bandwidth usage by streamlining the allocation and use of electronic funds among a plurality of devices, improve communication between disparate devices by creating a forum to share or access information (e.g., a family wallet), increase user efficiency and user interaction performance by providing one or more user interaction tools (e.g., family wallet application), and/or reduce error rate by automating the authorization and approval process.

The examples described herein may be implemented using computer programming or engineering techniques including computer software, firmware, hardware or a combination or subset thereof, to implement operations including at least one of: a) associating a device with an account; b) receiving an identification of a financial account; c) associating a financial account with an account; d) receiving an identification of a device; e) transmitting an invitation to be associated with an account; f) receiving an acceptance of an invitation to be associated with an account; g) receiving an instruction to authorize a device to have access to a quantity of funds associated with an account; h) authorizing a device to have access to a quantity of funds associated with an account; i) receiving a request to access a quantity of funds associated with an account; j) approving a request to access a quantity of funds on condition that a parameter associated with the request is included in one or more authorized parameters; k) approving a request to access a quantity of funds on condition that the quantity of funds is less than or equal to an authorized quantity of funds; l) transferring a quantity of funds between an account and a financial account; m) adjusting a quantity of funds that a device is authorized to access based on a quantity of funds that was accessed; n) receiving a request to adjust a quantity of funds; o) adjusting a quantity of funds based on a request to adjust the quantity of funds; p) transmitting transaction data to a device; and q) presenting transaction data associated with an approved request to access a quantity of funds.

FIG. 1 is a block diagram illustrating an example system or environment 100 for managing electronic funds in a network of computing devices. The environment 100 includes an electronic funds manager 110 that enables a first device 120 (e.g., a parent device) to manage electronic funds among a plurality of computing devices (e.g., a family of devices). For example, the system 100 includes one or more second devices 130 (e.g., child devices) that have at least some access to electronic funds managed by the electronic funds manager 110. The parent device 120 and/or the child device 130 may be coupled to the electronic funds manager 110 via a network 140. While some examples described herein may involve managing electronic funds between two computing devices (e.g., a parent device 120 and a child device 130), any quantity of computing devices may have access to the electronic funds that enables the electronic funds manager 110 to function as described herein.

The parent device 120 has a first level of authorization with respect to an account associated with electronic funds managed by the electronic funds manager 110. The child device 130 has a second level of authorization with respect to the account. The second level of authorization is different from the first level of authorization. For example, the first level of authorization enables the parent device 120 to add a source account, remove a source account, add a child device, remove a child device, add electronic funds, withdraw electronic funds, allocate electronic funds, and manage access to the electronic funds; and the second level of authentication enables the child device 130 to perform fewer operations than a parent device 120 (e.g., only withdraw electronic funds in accordance with one or more parameters, such as an allocation of the electronic funds). For example, in some examples, the child device 130 may not add a source account, remove a source account, add a child device, remove a child device, add electronic funds, allocate electronic funds, and manage access to the electronic funds. In at least some examples, the child device 130 is authorized to perform one or more but not all of these operations. That is, if a device is authorized to perform all of the operations of a parent device 120, then the device is considered to be or identified as a parent device 120. In at least some examples, a computing device may be a parent device 120 with respect to a first account, and a child device 130 with respect to a second account.

The parent device 120 is configured to establish a first account (e.g., family wallet) with the electronic funds manager 110. The parent device 120 is configured to couple or associate the family wallet with one or more second accounts such that electronic funds may be transferred between the family wallet and the second accounts. The second account may be any financial account, such as a personal checking account, personal savings account, a business checking account, a business savings account, a credit card account, a prepaid card account, and the like. A second account, for example, may be associated with a financial institution device 150 (referred to herein as "financial institution 150") associated with a bank, or an electronic commerce (e-commerce) payment system, such as PAYPAL brand online payment system and GOOGLE WALLET brand payment system. (PAYPAL is a trademark of PayPal, Inc., GOOGLE WALLET is a trademark of Google Inc.). ("Financial account" and "e-commerce payment system" may be used interchangeably herein). The financial institution 150 and/or the e-commerce payment system may be coupled to the electronic funds manager 110 via the network 140.

The parent device 120 is configured to invite one or more other devices to connect or have access to the family wallet. Upon acceptance of the first invitation, the other device becomes a child device 130 with respect to the family wallet. Additionally or alternatively, the parent device 120 may invite one or more other devices (including children devices 130) to be a parent device 120 with respect to the family wallet. For example, the parent device 120 may transmit a text message or other communication including a second invitation to another device using a telephone number or other contact information. Upon acceptance of the second invitation, the one or more other devices become parent devices 130 with respect to the family wallet.

The environment 100 may include one or more other entities, such as one or more merchant devices 160 (referred to herein as "merchants 160"). The merchant 160 is configured to accept payment from the electronic funds manager 110, the financial institution 150, and/or the e-commerce payment system. A user may present, for example, the parent device 120 and/or the child device 130 to purchase a good or service from a merchant 160, and the parent device 120 and/or the child device 130 may be detected using any device-to-device interaction protocol such as BLUETOOTH brand wireless technology standard, WI-FI brand local area wireless technology, WI-FI DIRECT brand Wi-Fi standard, ZIGBEE brand communication standard, near field communication (NFC) technology, received signal strength indicator (RSSI) technology, or proprietary radio protocols (BLUETOOTH is a trademark of Bluetooth Special Interest Group, WI-FI and WI-FI DIRECT are trademarks of the Wi-Fi Alliance, and ZIGBEE is a trademark of the ZigBee Alliance). Alternatively, the user may provide the merchant 160 with account information associated with the family wallet without physically presenting the parent device 120 and/or the child device 130 (e.g., for remote financial transactions, including e-commerce transactions, card-not-present transactions, or card-on-file transactions). Account information may include a name of the user, an account number, a security code, and/or a personal identification number (PIN).

The merchant 160 is configured to request authorization from the electronic funds manager 110 for at least the amount of the purchase. The authorization request may include at least the amount of the purchase and account information. For example, the merchant 160 may transmit the authorization request to the electronic funds manager 110 via the network 140. The electronic funds manager 110 may determine whether to approve or decline the authorization request from the merchant 160 based on whether the account information received from the merchant 160 matches or corresponds with the account information associated with the family wallet, whether the family wallet is in good standing, and/or whether the purchase is covered by (e.g., less than) an account balance associated with the family wallet.

Additionally or alternatively, the electronic funds manager 110 may determine whether to approve or decline the authorization request from the merchant 160 based on whether one or more parameters satisfy one or more predetermined thresholds. The parameters may be associated with a device, a quantity of electronic funds, a frequency or rate of requests, a time, a day, a date, a week, a month, a year, a geolocation, a merchandise type, a type of merchant, and the like. The predetermined thresholds may be established, for example, by the parent using the parent device 120. For example, the parent may authorize the electronic funds manager 110 to approve authorization requests associated with an authorized device, an authorized quantity of electronic funds, an authorized frequency or rate of requests, an authorized time, an authorized day, an authorized date, an authorized week, an authorized month, an authorized year, an authorized geolocation, an authorized merchandise type, and/or an authorized type of merchant.

If the request for authorization is declined, the merchant 160 is notified as such. If the request for authorization is approved, an approval of the authorization request is transmitted to the merchant 160, and the account balance associated with the family wallet is decreased (e.g., the electronic funds are automatically withdrawn from the family wallet). In at least some examples, the electronic funds manager 110 will not approve an authorization request if an approval of the request would result in a negative balance. Alternatively, if an approval of the request results in a negative balance, the electronic funds manager 110 may extend a line of credit such that the account balance associated with the family wallet is a negative balance and bill a user (e.g., a user associated with the parent device 120) to settle the negative balance.

In some examples, the electronic funds manager 110 is coupled to other entities (e.g., social media platforms) via the network 140. In some examples, the electronic funds manager 110 is configured to publish activity associated with the family wallet on social media. For example, the electronic funds manger 110 may receive information relating to a savings goal and transmit information to the social media platform such that the information may be published to an audience on the social media platform.

The examples described herein may be implemented in a variety of scenarios. For example, a family wallet may be used by a family with at least one parent that uses the parent device 120 and a child that uses the child device 130. In such an example, the parent may issue an allowance to the child via the electronic funds manger 110 by allocating a predetermined amount of electronic funds for the child device 130. The allocation may be a one-time event and/or a recurring event. In at least some examples, the child may request, via the child device 130, for an allocation, and the parent may approve or decline, via the parent device 120, the request for the allocation. For another example, the family wallet may be used by a business with at least one manager that uses the parent device 120 and a subordinate that uses the child device 130. For yet another example, the family wallet may be used by a family with at least one adult that uses the parent device 120 and an elder adult that uses the child device 130.

Figure 2:
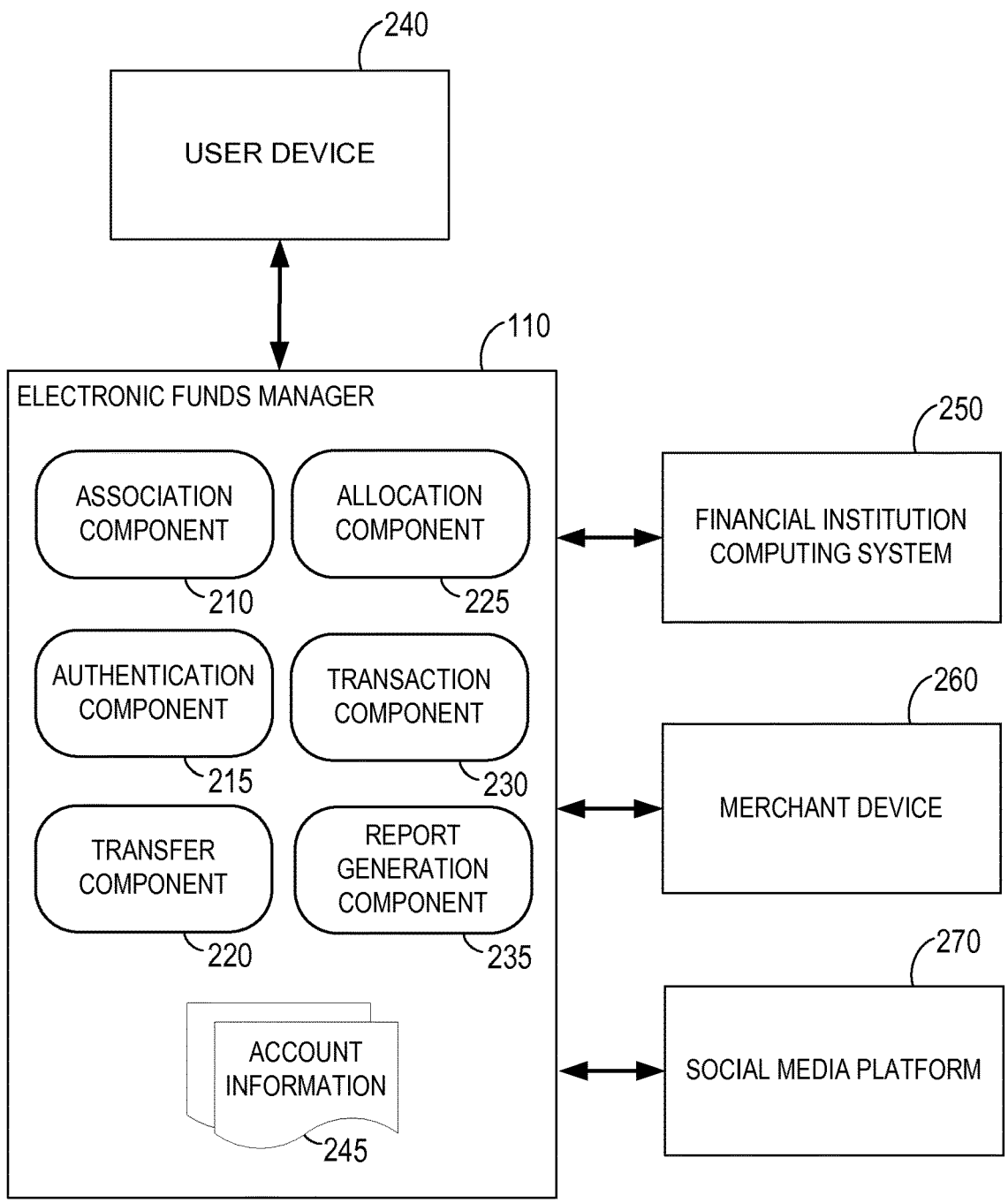
FIG. 2 is a block diagram illustrating example components that may be used to manage electronic funds in an environment, such as the environment shown in FIG. 1.

FIG. 2 is a block diagram illustrating example computing systems that may be used to manage electronic funds. The electronic funds manager 110 includes a plurality of components including an association component 210, an authentication component 215, a transfer component 220, an allocation component 225, a transaction component 230, and a report generation component 235. Each component may communicate with another component to implement the operations described herein. In some examples, one or more components are configured to communicate with other computing systems and/or devices, such as the financial institution computing system 250 and a user device 240 (e.g., parent device 120, child device 130).

The association component 210 is configured to associate one or more user devices 240 with a family wallet. For example, the association component 210 may facilitate an initialization phase of the family wallet. In at least some examples, the user device 240 downloads a mobile application (app) from the electronic funds manager 110 and/or from a mobile software distribution platform. During the initialization phase, the association component 210 is configured to prompt a user of a first user device 240 to create a family wallet by providing account information 245. Account information 245 may be stored locally at the electronic funds manager 110 and/or in an account information storage device accessible to the electronic funds manager 110.

In some examples, the association component 210 identifies the first user device 240 as a parent device 120 with respect to the family wallet and associates the first user device 240 with the family wallet such that the first user device 240 has a first level of authorization with respect to the family wallet. The username serves to uniquely identify a user of a user device 240. For example, the username may be based on a telephone number or email address. In at least some examples, the account information 245 includes an image, an avatar, or an icon.

The association component 210 may prompt the user of the parent device 120 to invite one or more second user devices 240 to connect or have access to the family wallet by providing contact information, such as a telephone number or email address. In at least some examples, the parent device 120 may provide an authorization level associated with the invitation. The association component 210 receives a request to add a second user device 240 (e.g., a child device) to the family wallet. The association component 210 generates an invitation and transmits a text message or other communication including the invitation to the second user devices 240 using the telephone number, email address, or other contact information. Additionally or alternatively, the parent device 120 may transmit a text message or other communication including the invitation to the second user devices 240.

Upon acceptance of the invitation, the association component 210 associates the second user device 240 with the family wallet. In at least some examples, the association component 210 associates the second user device 240 with the family wallet in accordance with the authorization level provided by the parent device 120. In some examples, a user device 240 identified as a child device 130 with respect to a first family wallet may create a second family wallet. In such examples, the user device 240 may be identified as a parent device 120 with respect to the second family wallet.

The authentication component 215 is configured to authenticate a user device 240. For example, the authentication component 215 may use a multi-factor authentication to authenticate the user device 240 by generating a security token and transmitting the security token to the user device 240. Upon authenticating the user device 240, the authentication component 215 may prompt a user to provide a passcode, such as a password or PIN. In one example, the passcode includes any combination of numbers, letters, and/or characters of any length. For example, the passcode may be an 8-digit number. In another example, the passcode may include a biometric sample, such as a thumbprint or fingerprint. In yet another example, the passcode may include a unique motion at or about the mobile device.

The transfer component 220 is configured to communicate with a computing system 250 associated with a financial institution 150 (shown in FIG. 1) to request and/or receive funds from a financial account associated with the financial institution 150. Alternatively, the computing system may be associated with an e-commerce payment system. The financial institution computing system 250 manages information related to financial accounts including balances and transactions and facilitates transactions involving the financial account including deposits, debits, wire transfers, and the like.

In some examples, the financial account serves as a source account for a family wallet managed by the electronic funds manager 110. The source account enables the family wallet to be funded with electronic funds. For example, the transfer component 220 may transmit a request for funds to the financial institution computing system 250, which determines whether to fulfill the request. The request may include information such as a quantity of electronic funds, a transaction type, an account identifier, and/or a transfer date. The financial institution computing system 250 may determine whether the financial account has sufficient funds to withdraw a requested quantity of electronic funds from the financial account without resulting in a negative balance (e.g., determine whether the requested quantity of electronic funds is less than or equal to the electronic funds associated with the financial account). If the financial account has sufficient funds to withdraw the requested quantity of electronic funds without resulting in a negative balance, the financial institution computing system 250 decreases the financial account by the requested quantity of electronic funds and transmits a signal to the transfer component 220 that instructs the electronic funds manager 110 to increase a balance associated with the family wallet by the requested quantity of electronic funds. In some examples, the electronic funds are transferred securely between the financial institution computing system 250 and the electronic funds manager 110. Additionally, the transfer component 220 may transmit a transfer of electronic funds to the financial institution computing system 250. That is, the electronic funds manager 110 decreases the balance associated with the family wallet, and the financial institution computing system 250 increases the financial account by a quantity of electronic funds associated with the transfer.

In some examples, the transfer component 220 facilitates the addition or removal of source accounts through an application program interface (API). Through API calls, the transfer component 220 may link the family wallet to a financial account associated with a financial institution 150, e-commerce payment system, or other digital currency provider. The parent device 130 may, for example, provide account information associated with the financial account. The transfer component 220 transmits a request to a financial institution computing system 250, for example, to fund the family wallet, receives electronic funds from the financial account, and increases a balance associated with the family wallet.

Access to the electronic funds may vary based on an allocation of electronic funds associated with a user device 240. The allocation component 225 may allocate at least some electronic funds in the family wallet for a particular user device 240 and/or allow the user device 240 to access at least a portion of the electronic funds in the family wallet. The allocation component 225 may receive, for example, a request from the parent device 120 to allocate electronic funds for use by a child device 130. The amount of funds allocated to the child device 130 by the parent device 120 may be an allowance for the child device 130.

The transaction component 230 is configured to approve or decline a request to access electronic funds in the family wallet. In some examples, the transaction component may determine whether to approve or decline a request associated with the user device 240 based on one or more parameters.

For example, the user device 240 may be authorized to access the electronic funds for an authorized merchant type (e.g., restaurants), an authorized geolocation (e.g., at a mall), at an authorized time (e.g., a time between 11:00 a.m. and 1:00 p.m.), etc. In at least some examples, the request is transmitted from a merchant device 260 and includes a transaction time, a transaction date, a transaction amount, a transaction location, and the like. Additionally or alternatively, the user device 240 may transmit at least some parameters including a transaction time, a transaction date, a transaction amount, a transaction location, and the like. In at least some examples, the request is transmitted from the user device 240. The transaction component 230 approves the request based on one or more parameters when the quantity of electronic funds associated with a request is less than or equal to a quantity of funds (e.g., a balance) associated with the family wallet.

The report generation component 235 is configured to analyze account information 245, such as transaction history, and generate one or more reports based on the account information 245. Transaction history may include transaction amounts, transaction dates, transaction times, transaction locations, and the like. The report generation component 235 may be coupled to one or more other entities (e.g., social media platform 270) such that the report generation component 235 is configured to transmit at least some data associated with the account information 245 (e.g., a report) to another entity for publishing online. For example, the report generation component 235 may identify a savings goal, and generate a report associated with savings progress for publishing on the social media platform 270. For another example, the report generation component 235 may associate an increase in electronic funds with an expenditure of electronic funds, and generate a report associated with the expenditure of electronic funds. In such an example, a monetary gift (e.g., cash, check, gift card, debit card) may be deposited into the family wallet, and the electronic funds from the monetary gift may be used to purchase an item. The report generation component 235 may be used to generate a message for transmission to a contributor of the gift (e.g., via email, text message, social media post, and the like).

The block diagram of FIG. 2 is merely illustrative of an example system that may be used in connection with one or more examples of the disclosure and is not intended to be limiting in any way. Further, peripherals or components of the computing devices known in the art are not shown, but are operable with aspects of the disclosure. In some examples, at least a portion of the functionality of the various elements in FIG. 2 may be performed by other elements in FIG. 2, or an entity (e.g., processor, web service, server, applications, computing device, etc.) not shown in FIG. 2.

Figure 3:
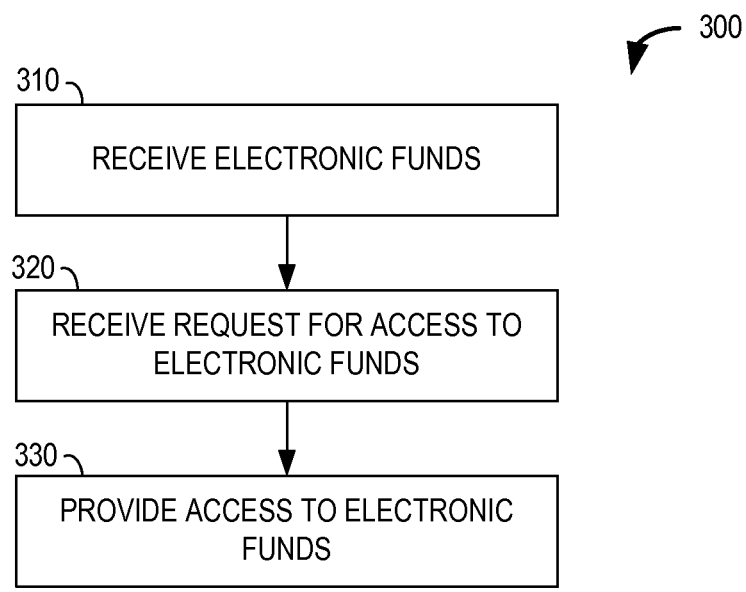
FIG. 3 is a flowchart illustrating an example method of managing electronic funds in an environment, such as the environment shown in FIG. 1.

FIG. 3 is a flowchart illustrating a method 300 for providing access to electronic funds in a digital wallet. The method 300 includes receiving electronic funds at 310. The electronic funds may be received from a financial institution 150 or from an e-commerce computing system. The family wallet allows for integration of different sources to fund the family wallet.

A request for access to the electronic funds is received at 320. In one example, the request to access the electronic funds is received from a merchant 160. Additionally or alternatively, the request to access the electronic funds may be received from the parent device 120 and/or the child device 130.

Access to funds in the family wallet is provided at 330. In some examples, the access is provided in response to the request for access to the electronic funds. Access to the funds may be provided based on whether one or more parameters satisfy one or more predetermined thresholds. In at least some examples, the predetermined thresholds are established using the parent device 120. For example, a mother may use the parent device 120 to give her daughter money for lunch. The mother may allocate some electronic funds in the family wallet for use by a child device 130, and the daughter may use the child device 130 to spend up to the allocated electronic funds at restaurants or other food establishments between 11:00 a.m. and 1:00 p.m.

Figure 4:
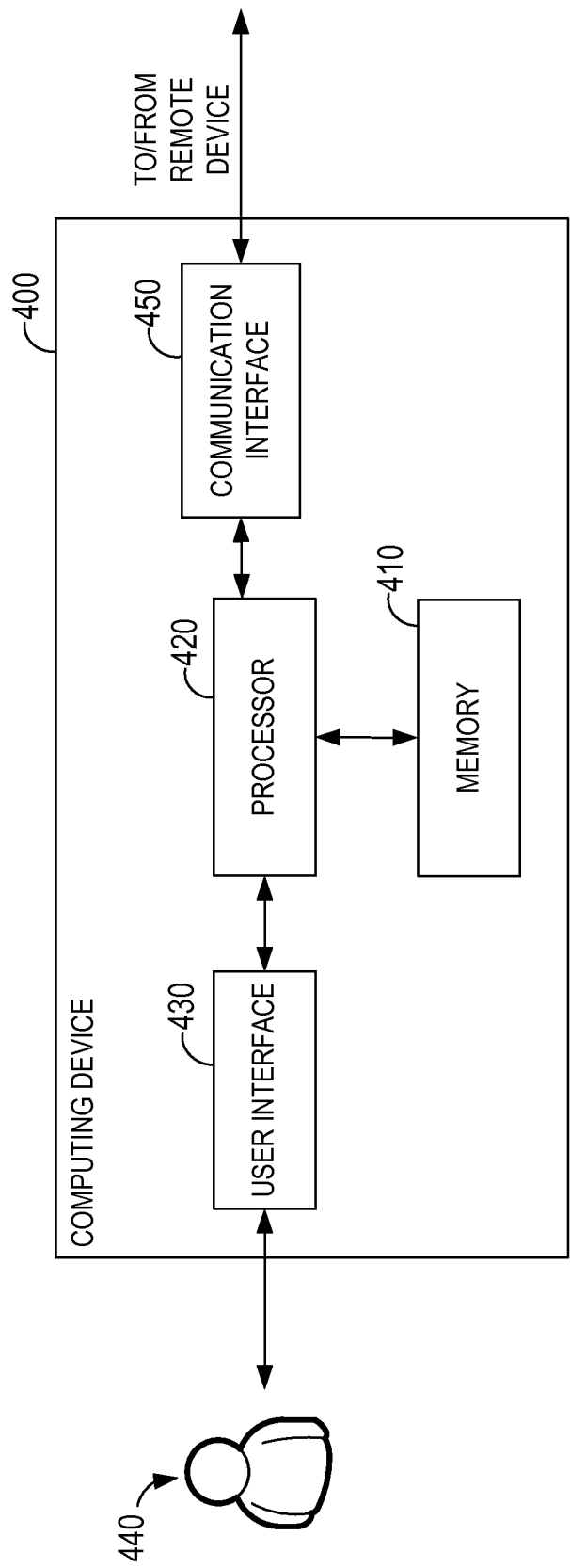
FIG. 4 is a block diagram illustrating an example computing device that may be used to manage electronic funds in an environment, such as the environment shown in FIG. 1.

FIG. 4 illustrates an example computing device 400 that may be used with the environment 100. While some examples of the disclosure are illustrated and described herein with reference to a computing device being an electronic funds manager 110, a user device 240 (e.g., parent device 120, child device 130), a financial institution computing system 250, and/or a merchant device 260, aspects of the disclosure are operable with any computing device that executes instructions to implement the operations and functionality associated with the computing device. The computing device 400 may include a portable media player, a mobile telephone, a tablet, a netbook, a laptop, a desktop computer, a computing pad, a kiosk, a tabletop device, an industrial control device, a wireless charging station, an electric automobile charging station, and other computing devices. Additionally, the computing device 400 may represent a group of processing units or other computing devices. Additionally, any computing device described herein may be configured to perform any operation described herein including one or more operations described herein as being performed by another computing device.

The computing device 400 includes one or more computer-readable media, such as a memory area 410 storing computer-executable instructions, an association component 210, an authentication component 215, a transfer component 220, an allocation component 225, a transaction component 230, a report generation component 235, account information 245, transaction information, financial institution information, merchant information, and other data, and one or more processors 420 programmed to execute the computer-executable instructions for implementing aspects of the disclosure. The memory area 410 includes any quantity of media associated with or accessible by the computing device 400. The memory area 410 may be internal to the computing device 400, external to the computing device 400 (not shown), or both (not shown).

The processor 420 includes any quantity of processing units, and the instructions may be performed by the processor 420 or by multiple processors within the computing device 400 or performed by a processor external to the computing device 400. The processor 420 is programmed to execute instructions such as those illustrated in the figures (e.g., FIGS. 3 and 5-9).

Upon programming or execution of these instructions, the processor 420 is transformed into a special purpose microprocessor or machine. For example, the association component 210, when executed by the processor 420, causes the processor 420 to associate a user device 240 with an account (e.g., family wallet); the authentication component 215, when executed by the processor 420, causes the processor 420 to authenticate a user device; the transfer component 220, when executed by the processor 420, causes the processor 420 to transfer electronic funds between the account and a financial account; the allocation component 225, when executed by the processor 420, causes the processor 420 to authorize a device to have access to a quantity of funds associated with the account; the transaction component 230, when executed by the processor 420, causes the processor 420 to approve a request to access a quantity of funds associated with the account; and/or the report generation component 235, when executed by the processor 420, causes the processor 420 to analyze account information and generate one or more reports based on the account information. Although the processor 420 is shown separate from the memory area 410, examples of the disclosure contemplate that the memory area 410 may be onboard the processor 420 such as in some embedded systems.

The computing device 400 includes at least one user interface 430 for exchanging data between the computing device 400 and a user 440. For example, the user interface 430 includes or is coupled to a presentation device configured to present information, such as text, images, audio, video, graphics, alerts, and the like, to the user 440. The presentation device may include, without limitation, a display, a speaker, a vibrating component, and the like. Additionally or alternatively, the user interface 430 includes or is coupled to an input device configured to receive information, such as user commands, from the user 440. The input device may include, without limitation, a controller, a camera, a microphone, or an accelerometer. In at least some examples, the presentation device and the input device are integrated in a common user interface 430 configured to present information to the user 440 and receive information from the user 440. For example, the user interface 430 may include, without limitation, a capacitive touch screen display, or a controller including a vibrating component. Alternatively, the user 440 may interface with the computing device 400 using any computing or peripheral device that enables the computing device 400 to function as described herein.

The computing systems described herein may include at least one communication interface for exchanging data between the computing device 400 and a remote device (e.g., a computer-readable media, another computing device). For example, the computing device 400 may be coupled to a server, a financial transaction processing computing device, a point-of-sale (POS) terminal, and/or a mobile device via a network (e.g., network 140) and/or the Internet. Communication between the computing device 400 and computer-readable media or another computing device may occur using any protocol or mechanism over any wired or wireless connection.

The block diagram of FIG. 4 is merely illustrative of an example system that may be used in connection with one or more examples of the disclosure and is not intended to be limiting in any way. Further, peripherals or components of the computing devices known in the art are not shown, but are operable with aspects of the disclosure. At least a portion of the functionality of the various elements in FIG. 4 may be performed by other elements in FIG. 4, or a computing device (e.g., a particularly-configured processor, web service, server, application, etc.) not shown in FIG. 4.

Figure 5:
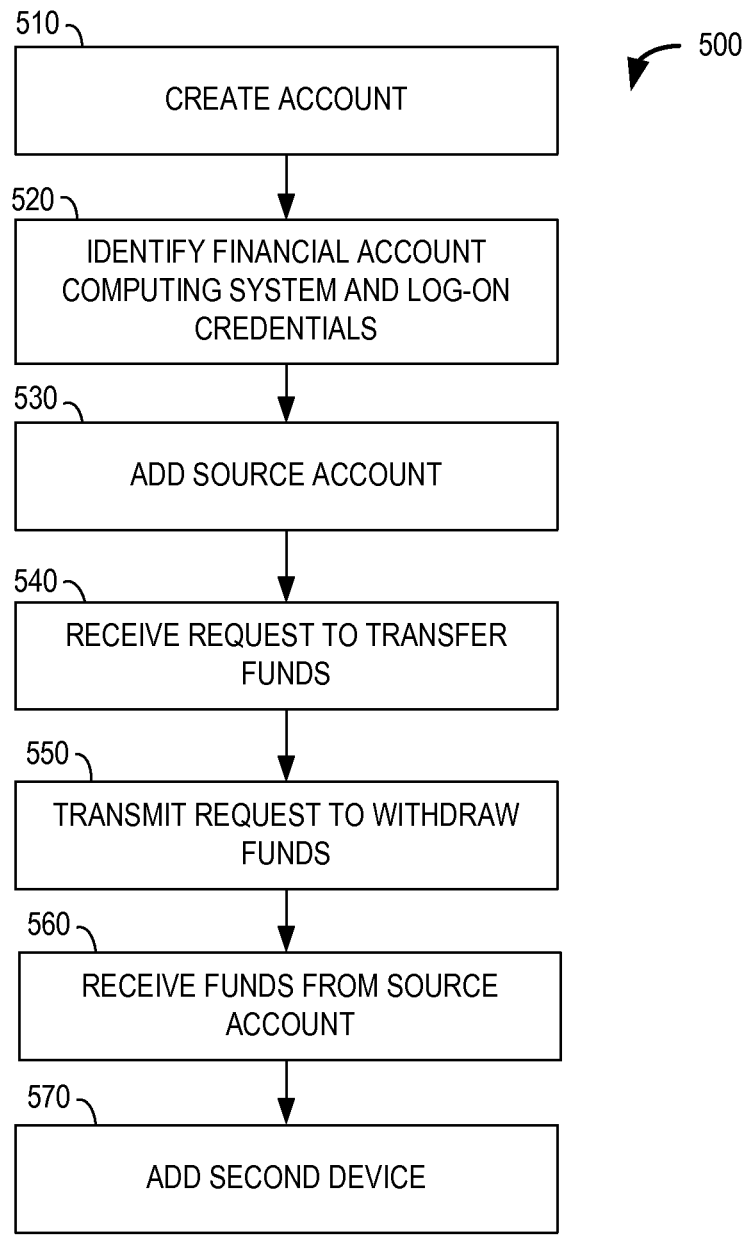
FIG. 5 is a flowchart illustrating an example initialization phase of managing electronic funds in an environment, such as the environment shown in FIG. 1.

FIG. 5 is a flowchart illustrating a method 500 for an initialization phase of the family wallet. FIGS. 6 and 7 are example sequence diagrams 600 and 700, respectively, that may be implemented in the environment 100 during the initialization phase of the family wallet.

In some examples, a user device 240 accesses a mobile software distribution platform to download a mobile application. Alternatively, the mobile application may be downloaded directly from an electronic funds manager 110. A user may request, via the mobile application, to create or establish an account (e.g., family wallet) with the electronic funds manager 110. The user device 240 transmits the request to the electronic funds manager 110 and, upon receiving the request, the electronic funds manager 110 creates the family wallet at 510 by associating the user device 240 with the family wallet (e.g., adding the user device 240 to the family wallet). Upon creating the family wallet, the user device 240 may be identified or recognized as a parent device 120.

The user device 240 may prompt, via the mobile application, the user to provide an identifier (e.g., a username) and/or passcode (e.g., password, PIN). For example, the user device 240 may display one or more fields configured to receive the identifier and/or passcode from the user. The user device 240 may receive the identifier and/or passcode from the user and transmit the identifier and/or passcode to the electronic funds manager 110. In at least some examples, the electronic funds manager 110 receives the identifier and/or passcode, and stores the identifier and/or passcode for verifying a user for subsequent attempts to access the family wallet.

The electronic funds manager 110 may prompt the user to add one or more source accounts by transmitting a request to identify one or more financial accounts to the parent device 120. The parent device 120 receives the request from the electronic funds manager 110, and presents, via the mobile application, the request to the user. The user may provide, via the mobile application, financial account information to add one or more source accounts to the family wallet. Alternatively, the financial account information may be retrieved from the account information 245. The parent device 120 transmits the financial account information to the electronic funds manager 110 and, upon receiving the financial account information, the electronic funds manager 110 identifies a financial institution, a financial institution computing system 250, and/or log-on credentials based on the financial account information at 520. In some examples, the electronic funds manager 110 transmits, to the financial institution computing system 250, log-on credentials. Alternatively, an e-commerce payment system may be identified based on the financial account information.

The financial institution computing system 250 receives the log-on credentials and verifies the log-on credentials by determining whether the log-on credentials correspond with or match the credentials associated with the financial account. If the log-on credentials do not correspond with the credentials associated with the financial account, the financial institution computing system 250 transmits, to the electronic funds manager 110, a notification that access to the financial account is declined, and the electronic funds manager 110 does not add the financial account as a source account for the family wallet. If the log-on credentials correspond with the credentials associated with the financial account, the financial institution computing system 250 transmits, to the electronic funds manager 110, a notification that access to the financial account is approved, and the electronic funds manager 110 adds the financial account as a source account for the family wallet at 530. The electronic funds manager 110 transmits, to the parent device 120, a notification indicating the addition of the source account to the family wallet, and the parent device 120 presents, via the mobile application, the notification to the user.

In at least some examples, the parent device 120 may receive a request to transfer funds between the family wallet and the financial account (e.g., a request to deposit electronic funds into or withdraw electronic funds from the family wallet). For example, the user may request, via the mobile application, to transfer a desired quantity of electronic funds between the family wallet and the financial account. The parent device 120 transmits the request to the electronic funds manager 110 and, upon receiving the request at 540, the electronic funds manager 110 identifies a financial institution and/or a financial institution computing system 250 associated with the request. Alternatively, an e-commerce payment system associated with the request may be identified.

If the request is a request to withdraw funds from the family wallet, the electronic funds manager 110 may determine whether the family wallet has sufficient electronic funds to process the withdrawal (e.g., the desired quantity of electronic funds is less than or equal to a balance of the family wallet). If the family wallet has sufficient funds, the electronic funds manager 110 transfers the desired quantity of electronic funds to the financial account.

If the request is a request to deposit funds into the family wallet, the electronic funds manager 110 transmits, to the financial institution computing system 250, a request to withdraw the desired quantity of electronic funds from the financial account at 550. The financial institution computing system 250 may determine whether the financial account has sufficient electronic funds to process the withdrawal (e.g., the desired quantity of electronic funds is less than or equal to a balance of the financial account). If the financial account has sufficient funds, the financial institution computing system 250 transfers the desired quantity of electronic funds to the family wallet, and the electronic funds manager 110 receives the desired quantity of electronic funds at 560. The electronic funds manager 110 transmits, to the parent device 120, a notification indicating the transfer of funds, and the parent device 120 presents, via the mobile application, the notification to the user.

In at least some examples, the parent device 120 may receive a request to add another user device (e.g., a second user device) to the family wallet. For example, the user may provide, via the mobile application, contact information associated with the second user device and/or a desired level of authentication associated with the second user device. The parent device 120 transmits the request to the electronic funds manager 110 and, upon receiving the request, the electronic funds manager 110 generates an invitation and transmits, to the second user device, the invitation using the contact information.

The invitation may include a link that enables the second user device to download the mobile application and/or automatically be associated with the family wallet in accordance with the request. If the request is not accepted, the second user device is not associated with the family wallet (e.g., the second user device is not added to the family wallet). If the request is accepted, the second user device transmits an acceptance of the invitation to the electronic funds manager 110. For example, a user of the second user device may provide, via the mobile application, the acceptance of the invitation. Upon receiving the acceptance, the electronic funds manager 110 adds the second device to the family wallet at 570 in accordance with the desired level of authentication (e.g., as a parent device 120 or as a child device 130). In at least some examples, the electronic funds manager 110 transmits, to the parent device 120, a notification indicating the addition of the second device, and the parent device 120 presents, via the mobile application, the notification to the user.

Figure 8:
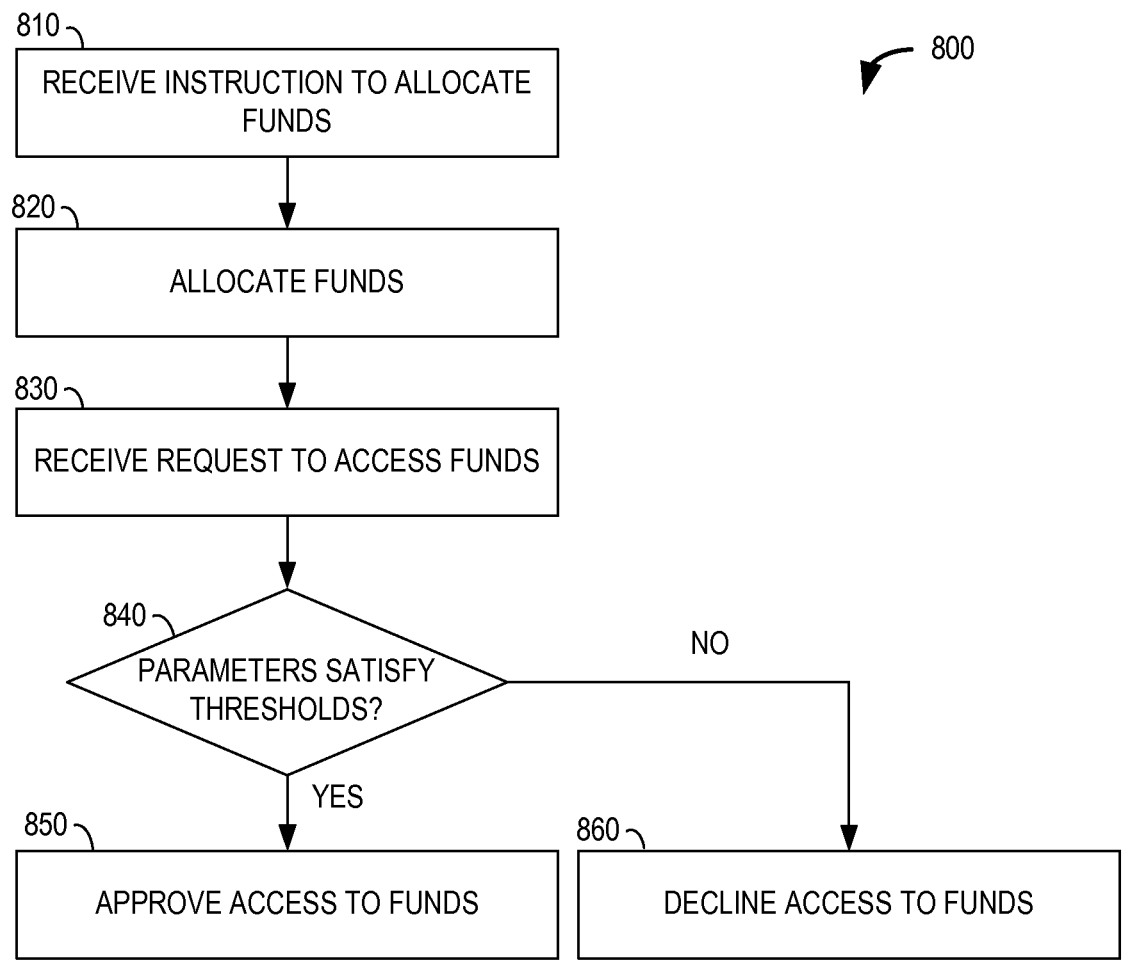
FIG. 8 is a flowchart illustrating an example use phase of managing electronic funds in an environment, such as the environment shown in FIG. 1.

FIG. 8 is a flowchart illustrating a method 800 for a use phase of the family wallet. FIG. 9 is an example sequence diagram 900 that may be implemented in the environment 100 during the use phase of the family wallet.

A user may allocate electronic funds among the various user devices associated with the family wallet. For example, a user may provide, via the mobile application, a desired quantity, a desired source account, and a desired target of the electronic funds into the parent device 120, and the parent device 120 may transmit, to the electronic funds manager 110, an instruction to allocate the electronic funds associated with the family wallet in accordance with the desired quantity, the desired source account, and the desired target of the electronic funds. In at least some examples, a user may select a source account and/or a target from a drop-down menu including previously-added financial accounts and/or user devices.

A parent device 120 may allocate electronic funds to other user devices including parent devices 120 and/or child devices 130. In at least some examples, the parent device 120 may be used to schedule a single allocation of electronic funds to a child device 130 (e.g., allocate a quantity of electronic funds at the first of the month for use by the child device 130 to use within the first week of the month). Additionally or alternatively, the parent device 120 may be used to schedule a recurring allocation of electronic funds to the child device 130 (e.g., allocate a quantity of electronic funds at the first of each month of the year for the child device 130).

The electronic funds manager 110 receives, from the parent device 120, the instruction to allocate the electronic funds at 810, and allocates the electronic funds in accordance with the instruction at 820. In at least some examples, a recipient of an allocation (e.g., a child device 130) may present, via a mobile application, a notification associated with the allocation. For example, the electronic funds manager 110 may transmit a notification of the allocation to the child device 130, and the child device 130, via the mobile application, may push a notification associated with the allocation to the user. In at least some examples, a balance of the family wallet and/or a balance of the allocation may be presented, via the mobile application, to a user of the child device 130.

At 830, the electronic funds manager 110 receives a request to access a quantity of electronic funds. The request may be received from a computing system associated with a merchant 160 with whom a user of the child device 130 has entered into a purchase transaction. Additionally or alternatively, the request may be received from the child device 130. For example, a user may provide, via the mobile application, a desired quantity of electronic funds into the child device 130, and the child device 130 may transmit the desired quantity of electronic funds to the electronic funds manager 110.

Upon receiving the request to access the quantity of electronic funds, the electronic funds manager 110 determines whether one or more parameters satisfy one or more predetermined thresholds at 840. For example, the electronic funds manager 110 may determine whether the family wallet and/or the allocation have sufficient electronic funds (e.g., the desired quantity of electronic funds is less than or equal to a balance of the family wallet and/or a balance of the allocation). If the one or more parameters satisfy the one or more predetermined thresholds, the request to access the quantity of electronic funds is approved at 850. If the one or more parameters do not satisfy the one or more predetermined thresholds, the request to the quantity of electronic funds is declined at 860. The electronic funds manager 110 transmits, to the requesting entity (e.g., computing system associated with a merchant 160, child device 130), an approval of the request, and the requesting entity receives the approval of the request.

Figure 10:
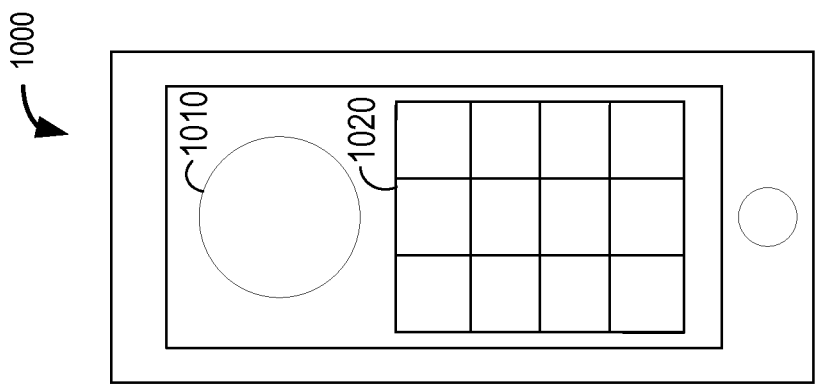

FIG. 10 is a schematic screenshot of an example sign-in screen 1000 of a mobile application that may be presented on a user device (e.g., parent device 120, child device 130). The sign-in screen 1000 enables a user to sign in or log-on to the mobile application. In some examples, the sign-in screen 1000 includes an image, avatar, or icon 1010 (e.g., a photo) that is personalized to the user and/or the user device.

The sign-in screen 1000 includes an input mechanism (e.g., keypad 1020) that allows the user to enter an identifier and/or passcode. In at least some examples, the sign-in screen 1000 may include a field that allows the identifier and/or passcode, or some representation of the identifier and/or passcode (e.g., asterisks, dots) to be displayed as the identifier and/or passcode are entered using the input mechanism. In at least some examples, the sign-in screen 1000 accepts biometric information (e.g., body print, eye scan, selfie, voice recognition, voice password). The identifier and/or passcode provide at least some protection from an unauthorized user gaining access to the family wallet. In some examples, the sign-in screen 1000 is the first screen that is shown when an icon of the mobile application is engaged on the user device (e.g., when the mobile application is opened or initialized).

Figure 11:
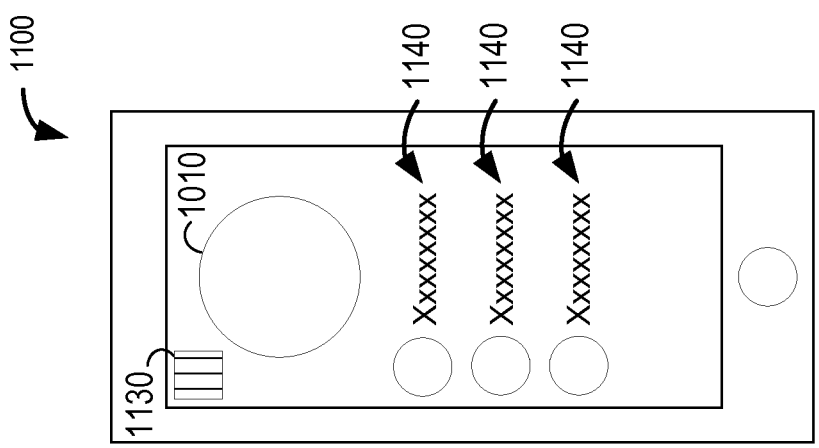

FIG. 11 is a schematic screenshot of an example home screen 1100 of a mobile application that may be presented on a user device (e.g., parent device 120, child device 130). In some examples, the home screen 1100 may be presented upon receiving input that corresponds with or matches an identifier and/or passcode associated with a family wallet (e.g., a successful log in). The home screen 1100 includes the personalized icon 1010 and a menu 1130 that enables a user to navigate throughout the mobile application. For example, the menu 1130 includes or is associated with one or more links to other screens, such as the home screen 1100, a user device management screen, an allocation screen, a reporting screen, and the like.

The home screen 1100 may present data associated with one or more transactions (e.g., transaction data 1140). The transaction data 1140 may include a variety of information, including a user, a personalized icon 1010, an item, a date, an amount, and the like associated with a transaction. Thus, the transaction data 1140 provides at least some context to the transactions. In at least some examples, one or more user devices associated with the family wallet are authorized to view the transaction data. For example, each user device associated with the family wallet may view expenditures associated with the other user devices associated with the family wallet. Alternatively, a parent device 120 may edit or adjust viewing privileges associated with one or more user devices (e.g., child device 130), such that the one or more user devices may view expenditures associated with a predetermined portion of the user devices. In at least some examples, a balance associated with the family wallet and/or a balance associated with the allocation (e.g., allocated funds for an allowance) are presented on the home screen 1100.

Figure 12:
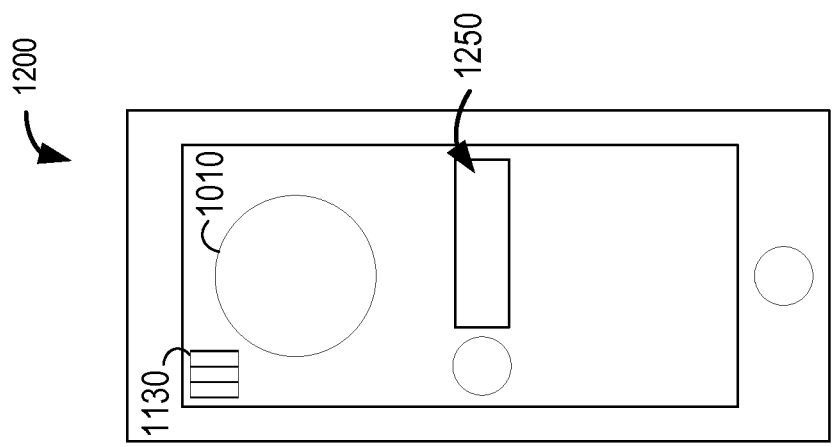
FIGS. 10-14 are schematic screenshots of an example mobile application that may be used in an environment, such as the environment shown in FIG. 1.

FIG. 12 is a schematic screenshot of an example user device management screen 1200 of a mobile application that may be presented on a user device (e.g., parent device 120, child device 130). The user device management screen 1200 enables a user of a parent device 120 to add one or more user devices to the family, remove one or more user devices from the family wallet, and/or modify a level of authorization associated with one or more user devices. The user device management screen 1200 includes the personalized icon 1010 and the menu 1130. For example, the menu 1130 may be used to access the user device management screen 1200.

The user device management screen 1200 includes an input mechanism 1250 that allows the user to enter contact information associated with another user device. For example, the input mechanism 1250 may include a field that allows the contact information or some representation of the contact information (e.g., asterisks, dots) to be displayed as the contact information is entered using the input mechanism 1250. One or more users may be added to the family wallet using, for example, a telephone number. Upon receiving the contact information, an invitation may be generated and/or transmitted to the entered contact information. In at least some examples, the invitation allows the recipient (e.g., invitee) to automatically associate the user device with the family, such that the user device may be used to access electronic funds associated with the family wallet.

In some examples, the user device management screen 1200 includes a listing for one or more user devices associated with the family wallet. In at least some examples, the listing may be selected to disassociate the corresponding user device from the family wallet or modify a level of authentication associated with the corresponding user device. In some examples, the parent device 120 is authorized to access the user device management screen 1200. Additionally, a parent device 120 may authorize another connected device to view and use the user device management screen 1200.

Figure 13:
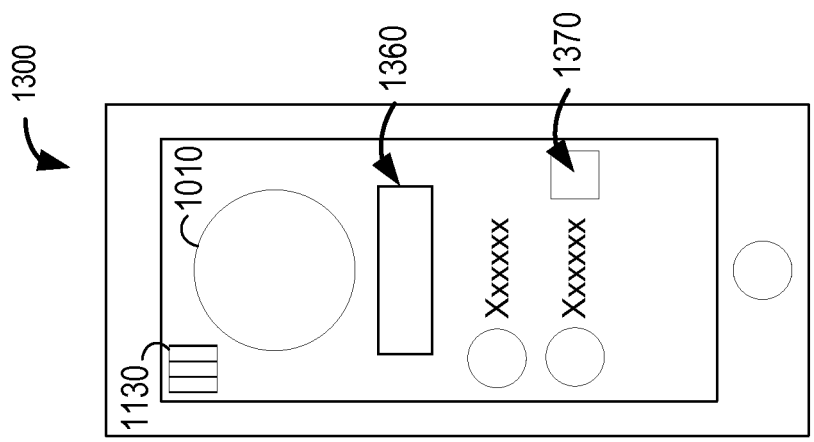

FIG. 13 is a schematic screenshot of an example allocation screen 1300 of a mobile application that may be presented on a user device (e.g., parent device 120, child device 130). The allocation screen 1300 enables a user of a parent device 120 to allocate electronic funds to one or more user devices. The allocation screen 1300 includes the personalized icon 1010 and the menu 1130. For example, the menu 1130 may be used to access the allocation screen 1300.

The allocation screen 1300 includes a first input mechanism 1360 that allows the user to enter a source account, and one or more second input mechanisms 1370 that allow the user to enter a desired quantity of electronic funds for a target user device. For example, the first input mechanism 1360 may include a drop down menu that allows the source account to be selected, and the second input mechanisms 1370 may include a field that allows a desired quantity of electronic funds or some representation of the desired quantity of electronic funds (e.g., asterisks, dots) to be displayed as the desired quantity of electronic funds is entered using the second input mechanism 1370.

To allocate electronic funds, a user may select a source account using the first input mechanism 1360. The source account may be linked to the family wallet through API calls to the financial institution. In at least some examples, the user may be required to enter the log-on credentials to access the financial account (e.g., the source account). Additionally or alternatively, the log-on credentials may be stored in a memory device and/or a computing system.

In some examples, the allocation screen 1300 includes a listing for one or more user devices associated with the family wallet. In at least some examples, the listing may be selected to prompt the second input mechanism 1370 to accept user input associated with a desired quantity of electronic funds associated with the corresponding user device. In some examples, the parent device 120 is authorized to access the allocation screen 1300. Additionally, a parent device 120 may authorize another connected device to view and use the allocation screen 1300.

Figure 14:
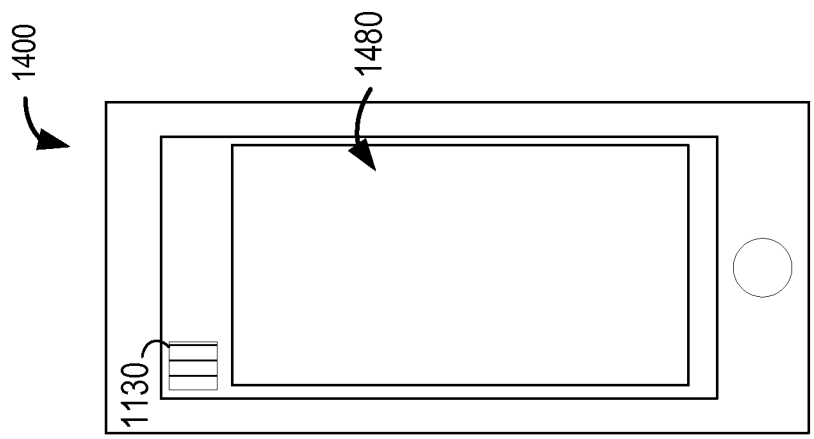

FIG. 14 is a schematic screenshot of an example report screen 1400 of a mobile application that may be presented on a user device (e.g., parent device 120, child device 130). The report screen 1400 enables a user of a user device (e.g., parent device 120, child device 130) to view a variety of information. The report screen 1400 includes the menu 1130. For example, the menu 1130 may be used to access the report screen 1400.

The report screen 1400 presents family wallet information to a user. The information may be arranged, organized, filtered, and the like based on a user device, a date range, a geolocation, a merchandise type, a type of merchant, transaction amount, transaction frequency, and the like. In some examples, the report screen 1400 shows a timeline trend with respect to one or more parameters. In some examples, the parent device 120 is authorized to access the report screen 1400. Additionally, a parent device 120 may authorize another connected device to view and use the report screen 1400.

The subject matter described herein enables a computing device to manage electronic funds in a network of computing devices in an efficient and user-friendly manner. The examples described herein provide a centralized system for efficient management of electronic funds between a plurality of accounts and among a plurality of devices. Additionally, the subject matter described herein enables a computing device to provide security for financial transactions, thereby increasing a reliability of financial transaction data.

Example computer-readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer-readable instructions, data structures, program modules or other data. Computer storage media are tangible and mutually exclusive to communication media. Computer storage media are implemented in hardware and exclude carrier waves and propagated signals. Computer storage media for purposes of this disclosure are not signals per se. Example computer storage media include hard disks, flash drives, and other solid-state memory. In contrast, communication media typically embody computer readable instructions, data structures, program modules, or other data in a modulated data signal such as a carrier wave or other transport mechanism and include any information delivery media. The processor and the memory may be supplemented by, or incorporated in, special purpose logic circuitry.

Although described in connection with an example computing system environment, examples of the disclosure are capable of implementation with numerous other general purpose or special purpose computing system environments, configurations, or devices. Generally, a computing system includes a central processing unit for performing or executing instructions and one or more memory devices for storing instructions and data. The central processing unit receives instructions and data from a read-only memory or a random access memory or both. The computing system may include, or be operatively coupled to receive data from or transfer data to or both, one or more mass storage devices for storing data, e.g., magnetic, magneto optical disks, or optical disks. A computing system may be embedded in any device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

The subject matter described herein may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the subject matter described herein, or any combination of the back end, middleware, or front end components. The components of the computing system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

Examples of computing systems, environments, and/or configurations that may be suitable for use with aspects of the disclosure include, but are not limited to, mobile computing devices, personal computers, server computers, handheld or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, earphones, and the like), network PCs, minicomputers, mainframe computers, distributed computing environments that include any of the above systems or devices, and the like. Such systems or devices may present information to the user in any way, including with a display devices such as a CRT (cathode ray tube) or LCD (liquid crystal display) monitor, and accept input from the user in any way, including from input devices such as a keyboard or pointing device, via gesture input, proximity input (such as by hovering), and/or via voice input.

In some examples, an image of the display may be configured to appear on a foreign surface other than on the display device. For example, an image of the display may be shown on a wall surface, a human skin surface, or any other surface. In some examples, the foreign surface may be an interactive surface configured to receive input at the foreign surface. Other kinds of devices may be used to provide for interaction with a user. For example, feedback provided to the user may be any form of sensory feedback, e.g., visual feedback, auditory feedback, or tactile feedback; and input from the user may be received in any form, including acoustic, speech, or tactile input. Additionally or alternatively, a computing system may interact with a user by sending documents to and receiving documents from a user device.

The computing system may encompass any kind of apparatus, device, or machine that processes data including, by way of example, a programmable processor, a computer, or multiple processors or computers. The computing system may include special purpose logic circuitry, e.g., an FPGA (field programmable gate array) or an ASIC (application specific integrated circuit). Additionally or alternatively, the computing system may include code that creates an execution environment for the computer program, e.g., code that constitutes processor firmware, a protocol stack, a database management system, an operating system, or a combination of one or more of them.

The processes and logic flows described here may be performed by one or more programmable computing systems executing one or more computer programs to perform functions by operating on input data and generating output. The processes and logic flows may be performed by, and the apparatus may be implemented as, special purpose logic circuitry. In some cases, the one or more programmable computing systems may be connected by a network to form a distributed computing environment (e.g., a cloud).

Examples of the disclosure may be described in the general context of computer-executable instructions executed by one or more computing systems or other devices in software, firmware, hardware, or a combination thereof. The computer-executable instructions, which may also be referred to or described as a computer program, a program, software, an application, a software application, a script, logic, or code, may be written in any form of programming language, including compiled or interpreted languages, or declarative or procedural languages, and may be deployed in any form, including as a standalone program or as a module, component, subroutine, or other unit suitable for use in a computing environment.

The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

The computer-executable instructions may correspond to a portion of a file that holds other programs or data (e.g., one or more scripts stored in a markup language document), in a single file dedicated to the computer program, or in multiple coordinated files (e.g., files that store one or more modules, sub programs, or portions of code). The computer-executable instructions may be deployed to be executed on one computer or on multiple computers that are located at one site or distributed across multiple sites and interconnected by a communication network.

The examples illustrated and described herein as well as examples not specifically described herein but within the scope of aspects of the disclosure constitute example means for managing one or more transactions. For example, the elements illustrated in FIGS. 1, 2, and 4 such as when encoded to perform the operations illustrated in FIGS. 3 and 5-9 constitute at least an example means for associating a device with an account, an example means for authorizing the device to have access to a quantity of funds in the account, an example means for approving a request to access the quantity of funds.

While this disclosure includes specific implementation details, these should not be construed as limitations on the scope of what may be claimed, but rather as descriptions of features that may be specific to particular examples. Certain features that are described in this specification in the context of separate examples may also be implemented in a single examples. Conversely, various features that are described in the context of a single examples may also be implemented in multiple examples separately or in any suitable subcombination.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. Moreover, the separation of various system components in the examples described above should not be understood as requiring such separation in all examples, and it should be understood that the described program components and systems can generally be integrated together in a single software product or packaged into multiple software products.

When introducing elements of aspects of the disclosure or the examples thereof, the articles "a," "an," "the," and "said" are intended to mean that there are one or more of the elements. Furthermore, references to an "example" of the present disclosure are not intended to be interpreted as excluding the existence of additional examples that also incorporate the recited features. The terms "comprising," "including," and "having" are intended to be inclusive and mean that there may be additional elements other than the listed elements. The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

In some examples, the operations illustrated in the drawings may be implemented as software instructions encoded on a computer-readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

What is claimed is:

1. A computer-implemented method for managing one or more transactions in a digital wallet, the computer-implemented method comprising:
    coupling a first device and a second device,
    the first device coupled to the second device by a computer,
    the computer accessing a first account in the digital wallet,
        the first device having a first level of authorization with respect to the first account, the second device having a second level of authorization with respect to the first account, and the second level of authorization differing from the first level of authorization and provided by the first device;
    receiving, from the first device, an instruction to authorize the second device, and the second device to have access to a first quantity of funds associated with the first account,
        where the instruction authorizes the second device to have access to the first quantity of funds associated with the first account for one or more transactions associated with one or more authorized geolocations;
    authorizing, by the computer and based on at least one parameter transmitted by the second device, the second device to have access to the first quantity of funds associated with the first account;
    receiving, from the second device, a first request, the first request to access a second quantity of funds associated with the first account;
    determining that the second quantity of funds associated with the first account is less than or equal to the first quantity of funds associated with the first account;
    approving, by the computer, the first request, for the second device to access the second quantity of funds associated with the first account, the approving occurring when the second quantity of funds associated with the first account is determined to be less than or equal to the first quantity of funds associated with the first account, wherein approving the first request for the second device to access the second quantity of funds associated with the first account comprises approving the first request on condition that a geolocation associated with the first request for the second device to access the second quantity of funds associated with the first account is included in the one or more authorized geolocations;
    upon approving the first request to access the second quantity of funds associated with the first account, transferring the second quantity of funds associated with the first account to another account; and
    adjusting the first quantity of funds associated with the first account based on the second quantity of funds associated with the first account, such that an adjusted first quantity of funds associated with the first account is allocated to the second device.

2. The computer-implemented method of claim 1, further comprising:
    receiving, from the first device, an identification of one or more second accounts; and
    upon receiving the identification of the one or more second accounts, associating the one or more second accounts with the first account, such that at least some funds are transferrable between the one or more second accounts and the first account.

3. The computer-implemented method of claim 1, further comprising:
    receiving, from the first device, an identification of the second device;
    upon receiving the identification of the second device, transmitting, to the second device, an invitation to be associated with the first account; and
    receiving, from the second device, an acceptance of the invitation to be associated with the first account, wherein the second device is associated with the first account upon receiving the acceptance of the invitation to be associated with the first account.

4. The computer-implemented method of claim 1, further comprising:
    receiving, from the second device, a request to adjust the first quantity of funds associated with the first account.

5. The computer-implemented method of claim 1, further comprising receiving, from the first device, an instruction to authorize the second device to have access to the first quantity of funds associated with the first account for one or more transactions associated with one or more authorized merchandise types, wherein approving the first request to access the second quantity of funds associated with the first account comprises approving the first request on condition that a merchant type associated with the first request is included in the one or more authorized merchandise types.

6. The computer-implemented method of claim 1, further comprising:
receiving a second request to access a third quantity of funds, the second request to access the third quantity of funds associated with the first device; and
upon receiving the second request to access the third quantity of funds, approving the second request to access the third quantity of funds.

7. The computer-implemented method of claim 1, further comprising transmitting transaction data to the first device, such that the first device is configured to present transaction data associated with the approved first request for the second device to access the second quantity of funds associated with the first account.

8. The computer-implemented method of claim 1, further comprising transmitting transaction data to the second device, such that the second device is configured to present transaction data associated with the approved first request for the second device to access the second quantity of funds associated with the first account.

9. A computing device configured to manage one or more transactions, the computing device comprising:
a memory storing data associated with one or more user devices, one or more accounts, and computer-executable instructions; and
a processor configured to execute the computer-executable instructions to:
receive, from a first device of the one or more user devices, an identification of a second device of the one or more user devices,
associate the first device with a first account in a digital wallet including the one or more accounts, wherein a first level of authorization with respect to the first account is associated with the first device;
couple the second device with the first account, wherein a second level of authorization with respect to the first account is associated with the second device, the second level of authorization being different from the first level of authorization and provided by the first device;
receive an instruction from the first device to authorize the second device to have access to a first quantity of funds associated with the first account for one or more transactions associated with one or more authorized geolocations;
authorize, and based on at least one parameter transmitted by the second device, the second device to have access to the first quantity of funds associated with the first account;
receive a request from the second device to access a second quantity of funds; and
determine that the second quantity of funds is less than or equal to the first quantity of funds associated with the first account;
approve the request from the second device to access the second quantity of funds from the first account, wherein the request from the second device to access the second quantity of funds is approved when the second quantity of funds is determined to be less than or equal to the first quantity of funds associated with the first account, wherein approving the request from the second device to access the second quantity of funds comprises approving the first request from the second device to access the second quantity of funds on condition that a geolocation associated with the request from the second device to access the second quantity of funds is included in the one or more authorized geolocations.

10. The computing device of claim 9, wherein the processor is further configured to execute the computer-executable instructions to:
receive, from the first device, an identification of one or more second accounts;
associate the one or more second accounts with the first account, such that at least some funds are transferrable between the one or more second accounts and the first account;
upon receiving the identification of the second device, transmit, to the second device, an invitation to be associated with the first account; and
receive, from the second device, an acceptance of the invitation to be associated with the first account, wherein the second device is associated with the first account upon receiving the acceptance of the invitation to be associated with the first account.

11. The computing device of claim 9, wherein the processor is further configured to
execute the computer-executable instructions to:
upon approving the request from the second device to access the second quantity of funds, transfer the second quantity of funds to another account; and
adjust the first quantity of funds associated with the first account based on the second quantity of funds, such that an adjusted first quantity of funds associated with the first account is allocated to the second device.

12. The computing device of claim 9, wherein the processor is further configured to
execute the computer-executable instructions to:
receive, from the second device, a request to adjust the first quantity of funds associated with the first account; and
adjust the first quantity of funds associated with the first account based on the request to adjust the first quantity of funds associated with the first account, such that an adjusted first quantity of funds is allocated to the second device.

13. The computing device of claim 9, wherein the processor is further configured to execute the computer-executable instructions to receive, from the first device, an instruction to authorize the second device to have access to the first quantity of funds associated with the first account for one or more transactions associated with one or more authorized parameters, wherein the one or more authorized parameters include the at least one parameter transmitted by the second device and one or more of an authorized merchant type and an authorized geolocation, and request to access the first quantity of funds associated with the first account is approved on condition that a parameter associated with the request to access the second quantity of funds is included in the one or more authorized parameters.

14. The computing device of claim 9, wherein the processor is further configured to execute the computer-executable instructions to:

receive a second request to access a third quantity of funds, the second request to access the third quantity of funds associated with the first device; and upon receiving the second request to access the third quantity of funds, approve the second request to access the third quantity of funds.

15. A computer-readable storage device having computer-executable instructions embodied thereon, wherein the computer-executable instructions are executable by a processor to:

couple a first device with a first account in a digital wallet, such that the first device has a first level of authorization with respect to the first account, couple a second device with the first account, such that the second device has a second level of authorization with respect to the first account that is provided by the first device and that is different from the first level of authorization with respect to the first account;

receive an instruction from the first device to:

authorize, based on at least one parameter transmitted by the second device, the second device to have access to a first quantity of funds associated with the first account for one or more transactions associated with one or more authorized geolocations, and authorize the second device to have access to the first quantity of funds associated with the first account;

receive a first request from the second device to access a second quantity of funds;

determine that the second quantity of funds is less than or equal to the first quantity of funds associated with the first account;

approve the first request from the second device to access the second quantity of funds, wherein the first request is approved when the second quantity of funds is determined to be less than or equal to the first quantity of funds associated with the first account, wherein approving the first request from the second device to access the second quantity of funds associated with the first account comprises approving the first request from the second device to access the second quantity of funds on condition that a geolocation associated with the first request to access the second quantity of funds associated with the first account is included in the one or more authorized geolocations; and transmit transaction data to one or more devices, such that the one or more devices are configured to present transaction data associated with the approved first request from the second device to access the second quantity of funds.

16. The computer-readable storage device of claim 15, wherein the computer-executable instructions are executable by the processor to:

receive, from the first device, an identification of one or more second accounts;

associate the one or more second accounts with the first account, such that at least some funds are transferrable between the one or more second accounts and the first account;

transmit, to the second device, an invitation to be associated with the first account; and receive, from the second device, an acceptance of the invitation to be associated with the first account, wherein the second device is associated with the first account upon receiving the acceptance of the invitation to be associated with the first account.

17. The computer-readable storage device of claim 15, wherein the computer-executable instructions are executable by the processor to adjust the first quantity of funds associated with the first account to a third quantity of funds, such that the third quantity of funds is allocated to the second device;

approve the first request from the second device to access the second quantity of funds on condition that the second quantity of funds is less than or equal to the third quantity of funds; and transfer the third quantity of funds to another account.

18. The computer-readable storage device of claim 15, wherein the computer-executable instructions are executable by the processor to receive, from the first device, an instruction to authorize the second device to have access to the first quantity of funds associated with the first account for one or more transactions associated with one or more authorized parameters, wherein the one or more authorized parameters include the at least one parameter transmitted by the second device and one or more of an authorized merchant type and an authorized geolocation;

approve a request to access the first quantity of funds associated with the first account on condition that a parameter associated with the request to access the second quantity of funds is included in the one or more authorized parameters; and transfer the first quantity of funds associated with the first account to another account.

19. The computer-readable storage device of claim 15, wherein the computer-executable instructions are executable by the processor to:

receive a second request to access a third quantity of funds, the second request to access the third quantity of funds associated with the first device; and upon receiving the second request to access the third quantity of funds, approve the second request to access the third quantity of funds.

* * * * *